May 30, 1961  B. D. POWER  2,986,024
SLIP COUPLINGS
Filed May 18, 1959  3 Sheets-Sheet 1

BASIL D. POWER,
INVENTOR

BY Hall & Houghton
ATTORNEY

BASIL D. POWER,
INVENTOR

BY Hall & Houghton
ATTORNEY

May 30, 1961 B. D. POWER 2,986,024
SLIP COUPLINGS
Filed May 18, 1959 3 Sheets-Sheet 3

BASIL D. POWER,
INVENTOR

BY Hall & Houghton

ATTORNEY

United States Patent Office 2,986,024
Patented May 30, 1961

2,986,024

SLIP COUPLINGS

Basil Dixon Power, Langley Green, Crawley, England, assignor to Edwards High Vacuum Limited, Crawley, England, a British company Filed May 18, 1959, Ser. No. 814,064

Claims priority, application Great Britain May 30, 1958

2 Claims. (Cl. 64—26)

This invention relates to slip couplings and has as its object to provide an improved form of slip coupling which can be made capable of slipping for an indefinite period without excessive heating and with negligible wear.

In very many cases where a motor, an engine or other prime mover is connected or coupled to a machine for the purpose of driving the machine, by belt and pulley, chain and sprocket, through gears, direct coupling or by other means, it is frequently required that, if ever the driving torque delivered by the prime mover or supplied to the machine rises to and tends to exceed a certain previously decided maximum, then the drive shall slip, so that the predetermined maximum torque is not exceeded. The driven machine, during the time when the drive is slipping, rotates at a slower speed than would correspond to the speed of the prime mover multiplied by the appropriate speed ratio for the drive transmission train.

As a particular example of a case where such a requirement may arise, it is convenient to consider a combination vacuum pump as described in the specification of British Patent No. 680,001. One such combination pump may consist of a so-called "Roots" pump pumping in series with an oil sealed mechanical vacuum pump. It is characteristic of such a "Roots" pump that a certain maximum driving torque cannot be safely exceeded, this maximum torque being determined by considerations related to the pump structure. The normal running condition of the pumping combination is such that the "Roots" pump operates with low absolute pressures on both its inlet and its outlet side, and it can therefore run at high rotational speed and develop a high volumetric displacement without a high pressure difference being developed across it and without the safe maximum driving torque being exceeded. Under certain usually transient conditions however, and particularly when exhausting a vessel from atmospheric pressure to a low absolute pressure, a dangerously high pressure difference, requiring an excessive driving torque to maintain it, would develop across the Roots pump if it were driven at the high rotational speeds normal and desirable for operation at low absolute pressures. Mechanical damage or burn out of the electric driving motor might result.

It is therefore desirable to include a slip coupling device in the driving train between the prime mover and the Roots pump such that the full rotational speed normally delivered by the prime mover and train is achieved at pressures so low that the driving torque is not excessive at this speed but such that, whenever conditions arise tending to increase the driving torque above the safe limit, the coupling will slip, thus reducing the pump speed and maintaining the driving torque below the safe limit.

If a pump combination provided with a slip coupling is set to evacuate a container from atmospheric pressure to low pressure, the drive to the Roots pump will initially slip so that the rotational speed of the pump is initially low whilst the maximum safe torque is applied to the pump shaft but is not exceeded. As exhaustion proceeds the pump rotational speed and volumetric speed of pumping will progressively increase until the full speed appropriate to the prime mover and driving train is attained. Coupling slip will then cease and thereafter the pump rotational speed will remain sensibly steady.

A wide variety of slip couplings having the general characteristic that slip occurs above a certain predetermined torque have been proposed. Many of these depend upon friction between solid members spring urged or urged by centrifugal force into contact and these types have the disadvantage that prolonged slipping results in excessive wear of the friction surfaces and that efficient heat dissipation from the heated surfaces cannot easily be achieved.

According to the present invention, a slip coupling comprises a driving member, a driven member and a closed path for liquid, such as oil, providing a liquid coupling between the driving and driven members which are arranged to co-operate so that whenever the rotational speed of the driving member exceeds that of the driven member, a positive displacement pumping action is produced causing the liquid to be pumped around said path. There is disposed in the liquid path a relief valve, or the equivalent, normally blocking the flow of the liquid but constructed to open when the pressure difference across it reaches a predetermined limit. The valve may be of the pre-set, adjustably loaded, pressure release type. The driving member is constructed to enable it to be coupled to a prime mover or to a driving train coupled to a prime mover, and the driven member is constructed to enable it to be coupled to a machine to be driven or to a transmission train coupled to the machine to be driven.

Further according to the invention, in order to reduce or eliminate noise which may be produced during operation of the coupling due to an effect to be described in detail hereinafter, provision may be made to induce air into the liquid path at a point or points where it can mix with the liquid to form an elastic and compressible medium. In particular forms of coupling in which such provision is made, air is transferred from a region in the liquid path such as a reservoir for the liquid, which region is temporarily vacated by the liquid due to centrifugal action during operation of the coupling and the air so transferred is directed to a region in the liquid path where it can mix with the liquid.

Specific means for effecting transfer of air in the manner referred to may consist of a tube positioned in the liquid reservoir and having open ends located adjacent liquid inlet ports which provide communication between the reservoir and the interior of the body of the coupling, the tube being formed with at least one orifice through which air occupying the region vacated by the liquid can pass to the open ends of the tube.

Particular forms of slip coupling constructed and arranged to operate in accordance with the invention will be described hereinafter but it is convenient firstly to consider the general principles of operation of a coupling embodying the invention, whatever the precise details of construction. Thus, assuming that in operation there is initially only a small torque to be transmitted, the driving member is rotated by the prime mover and tends to rotate relative to the driven member. The pumping action referred to immediately tends to circulate the working liquid in the coupling round the closed circuit provided. The passage of the working liquid is prevented by the pre-set pressure release valve so that the liquid cannot be pumped and the various members co-operating to form the positive displacement pump are hydraulically "locked" and cannot significantly move relative to each other. The driven member of the coupling therefore rotates with the driving member at the same rotational speed although insignificant speed differences may occur in practice due to slight liquid leakage.

Suppose now that the torque to be transmitted is progressively increased by the application of a load torque to the driven member. Initially the driven member continues to rotate at sensibly the same speed as the driving member, the increase in transmitted torque being accompanied by an increase in pressure in the liquid constituting the "hydraulic lock" preventing relative movement between driving and driven members. When the increasing load torque reaches a certain value such that the pressure in the liquid constituting the "hydraulic lock" is sufficient to open the pressure release valve, the liquid begins to circulate in the closed circuit provided, and relative movement between the driven and driving coupling members becomes possible and slip occurs.

Under slip conditions the coupling transmits an approximately constant torque of magnitude depending mainly on the coupling geometry and on the setting of the pressure release valve. If the driving torque required by the driven machine exceeds the torque transmitted under slip conditions then slip occurs and the rotational speed at which the driven machine is driven is reduced. In many cases the required driving torque reduces with rotational speed so that at a certain degree of slip the required torque becomes equal to the torque transmitted under slip conditions and stable conditions become established. Even if complete seizure of the driven machine were to occur however only a limited torque would be transmitted and the coupling would slip without trouble for an indefinite period provided the cooling arrangements were made adequate to the power absorbed.

The use of a liquid such as oil as the coupling medium ensures a well lubricated mechanism depending not at all on solid friction for its operation and even continuous slip should produce no more wear than would occur in a continuously operating pump pumping a liquid such as oil under ideally clean conditions.

Specific forms of slip coupling embodying the invention will now be described in greater detail by way of example with reference to the accompanying drawings in which.

Figure 3:
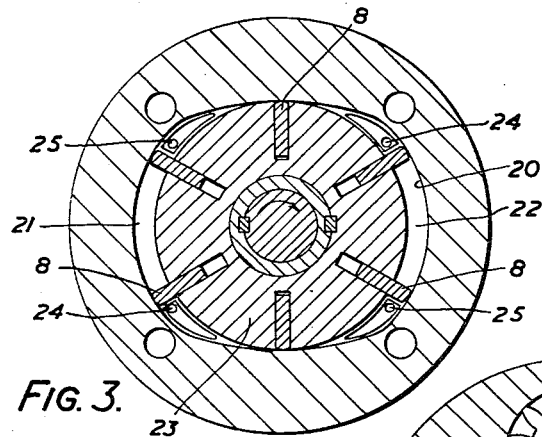
Figure 4:
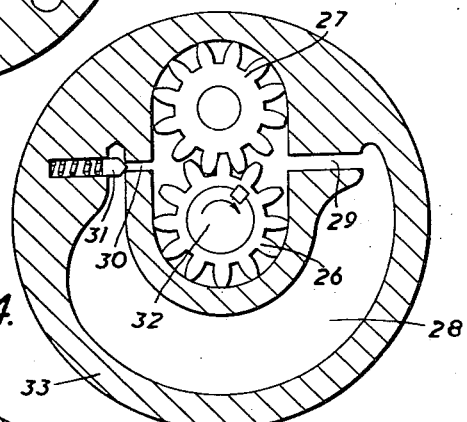
Figure 5:
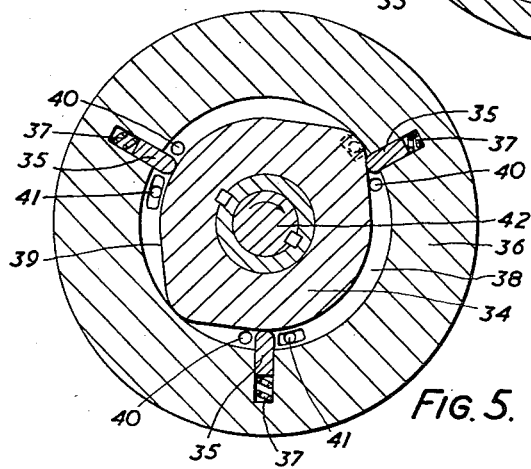
Figure 6:
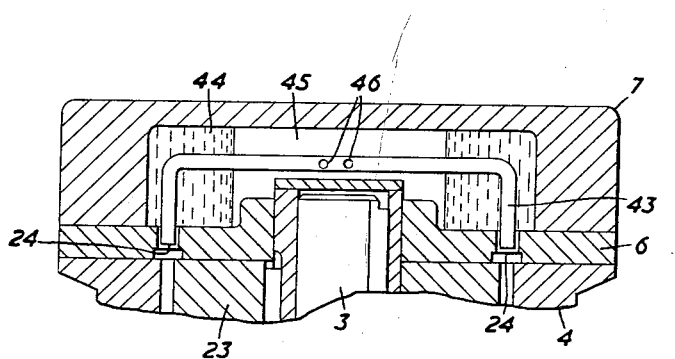

Figures 3, 4 and 5 each show front elevations in section of alternative forms of coupling, and Figure 6 is a fragmentary sectional illustration of a device which may be adopted in conjunction with the alternative forms of coupling to be described.

Figure 1:
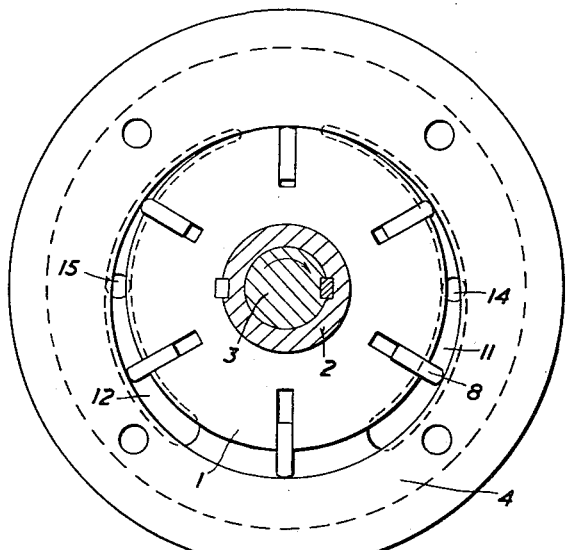
Figure 1 is a front elevation in section of one such form of coupling.
Figure 2:
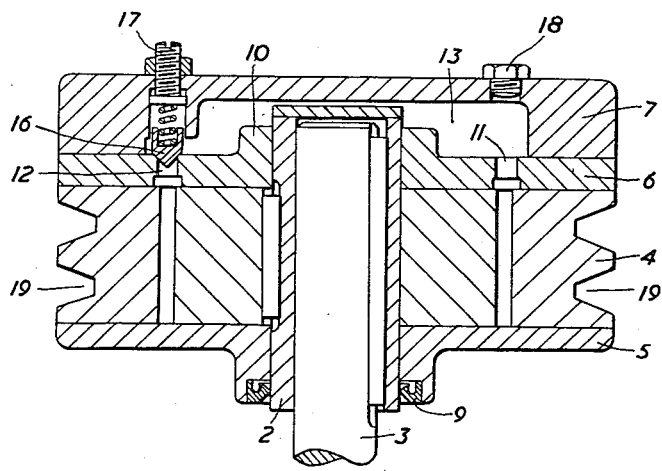
Figure 2 is a plan of Figure 1 in section.

Referring to Figures 1 and 2 of the drawings, the coupling shown is provided with a driving member which consists of a rotor 1 keyed to a hollow shaft 2 which is slipped over and secured to the shaft 3 of the driving motor to be employed. The driven member consists of a casing 4, end covers 5 and 6 and an oil reservoir cover 7. The casing 4 has an eccentric bore which, in conjunction with the rotor 1 and, with a number of radially slidable vanes 8 in slots in the rotor, constitutes a positive displacement pump.

The end cover 5 is provided with a bearing for the hollow rotor shaft 2 and also a shaft seal 9 to retain the filling oil. The end cover 6 is provided with a bearing 10 for the hollow rotor shaft 2 and has recessed into it, an inlet port 11 and an outlet port 12. These ports communicate with an oil reservoir 13 through holes 14 and 15 respectively, the communicating hole 15 from the outlet port 12 being normally closed by a spring loaded valve 16. The force provided by the spring can be adjusted by means of a screw 17 and a plug 18 is removable for supplying the reservoid with oil. The oil reservoir cover 7 may be provided with cooling fins to assist in heat dissipation, or a fan may be provided on the free extension of the hollow shaft 2, these cooling arrangements not being illustrated.

The casing 4 has external grooves 19 suitable for V belts to enable it to be belt coupled to a machine to be driven and the whole coupling unit is arranged to be a direct replacement for a driving pulley on a belt coupled motor.

In operation, as soon as the driving motor, not shown, is switched on, the rotor 1 rotates and the vanes 8 are flung by centrifugal force against the eccentric bore of the casing 4. The rotation of the rotor and blades tends to draw oil in from the reservoir 13 through the inlet hole 14 and to expel oil back to the reservoir through the outlet hole 15. The expulsion of the oil is prevented by the spring loaded valve 16, the rotor and casing become hydraulically locked together and the casing rotates with the rotor. If now the torque load on the coupling increases progressively, the oil pressure on the compression side of the pump formed by the driving and driven members of the coupling and the vanes also increases because this oil is responsible for transmitting the drive from the driving to the driven coupling member, and oil pressure is proportional to the torque transmitted. When the increasing torque load on the coupling reaches a value such that the oil pressure is sufficient to lift the valve 16, then the valve will lift, oil will begin to circulate from the reservoir through the pump formed in the coupling and back to the reservoir, the driven coupling member will slip and no further increase in torque load on the coupling will be possible.

The alternative form of slip coupling illustrated diagrammatically in Figure 3 has certain advantages over that shown in Figures 1 and 2. The important differences are in the bore of the casing and in the porting arrangements. The casing bore 20 is of generally oval outline so that two separate pumping chambers 21 and 22 are formed between it and the rotor 23 and two inlet and outlet ports 24 and 25 respectively are employed. The outlet ports 25 may deliver oil into a common duct, not shown, so that only one pressure release valve is required.

The main advantages of this arrangement over that of Figures 1 and 2 are as follows:

(1) The oil pressure distribution around the rotor is balanced so that the oil pressure imposes no load on the rotor bearings.

(2) The drive is transmitted through two blades or groups of blades on opposite sides of the rotor instead of through blades on one side of the rotor only. This permits lower oil pressures and smaller forces on the blades to be employed than would be required with a pulley of the form shown in Figure 2 under any given conditions.

(3) The blades do not slide in or out in their slot whilst they are transmitting drive. This results in less blade wear and in a more even and uniform transmission of the drive.

(4) The coupling is statically and dynamically balanced with regard to mass whereas that of Figures 1 and 2 requires a considerable balancing weight to be added.

Both the couplings described can be fitted with springs to urge the blades outwards against the casing bore and in both cases oil from the high pressure chambers in the couplings may be supplied to the spaces under the blades to ensure they maintain contact with the stator bore. In each case the coupling described may be mounted on the driven instead of on the driving shaft, or it may be used with chain or gear drive instead of belt drive or directly to couple two axially aligned shafts.

Figure 4 illustrates diagrammatically yet another form of the coupling and demonstrates that the invention can be carried out with various other forms of pump in addition to the radial vane pump. In Figure 4 a gear pump is employed, meshing gear wheels 26, 27, when excessive torque is applied, serving to pump oil from a reservoir 28 via an inlet port 29 to an outlet port 30 normally blocked by a pressure relief valve 31. The wheel 26 is keyed to a motor driven shaft 32 and thus constitutes the driving member, the casing 33 being the driven member.

The wheel 27 is free to rotate on a spindle fixed to the casing 33.

In operation, assuming the wheel 26 is driven, there will be such relative motion between it and the wheel 27 as required to build up an oil pressure on the outlet side which, at the maximum, will reach a relief pressure decided by the pre-selected torque to be transmitted. The relative motion between the wheels 26 and 27 up to this point will be negligible corresponding only to the compressibility of the oil so that the wheel 27 cannot turn on its spindle and the hydraulic lock produced will cause the casing 33 to turn round the centre of shaft 32 at the same speed as that shaft. If the torque transmitted exceeds the pre-selected value then the relief valve 31 will open and the oil will be circulated with consequential relief rotation between the wheels 26 and 27.

In the still further example of a coupling embodying the invention as illustrated diagrammatically in Figure 5, there is shown a cam pump formed by a cam 34 and blades 35 set in slots in the stator 36 and urged against the cam face by springs 37. The cam 34 is shaped to provide, in conjunction with the bore of the stator 36, pumping chambers 38, 39 having inlet ports 40 and outlet ports 41.

When the cam 34, keyed to a motor driven shaft 42 is rotated, the liquid in the chambers 38, 39 will normally lock the cams 34 and stator 36 in driving connection but when the pre-selected excessive torque is produced, the relief valve, not shown, will open enabling the liquid to be circulated by the pumping action and relative slip to occur between the driving and driven members, that is to say the cam 34 and the stator 36.

In use of any of the constructions described, it will be understood that instead of the casing being the driven member it may be the driving member and the rotor will then constitute the driven member.

The functioning of any of the forms of slip coupling described may be improved if steps are taken to avoid an effect which may occur and may result in undesirable noise in operation. The effect referred to may conveniently be explained by referring to the particular construction shown in Figure 3. When operating under slip conditions the blades 8 carried in the rotor 23 are continually approaching and passing the inlet ports 24, in the region of which the separation between the rotor and the casing walls is increasing in the direction of relative motion, so that the blades are sliding out of their slots and a void tends to be formed between any two adjacent blades. Into these voids flows the oil through the inlet ports 24, driven in by the pressure in the oil reservoir, the sequence described being, of course, the fluid intake sequence of the fluid pump formed by the co-operating rotor, blades and casing.

It cannot be expected that the volumetric efficiency of fluid intake for such a fluid pump will be 100 percent, particularly when the fluid is a significantly viscous liquid like oil. In fact the volumetric rate of oil intake does not keep pace with the rate of formation of the void, and the "pocket" formed between two blades is incompletely full of oil when it moves away from the inlet region. When the relative movement of the coupling parts puts this "pocket" into communication with an outlet port 25, the liquid content of the "pocket" must begin to transmit drive, and this can only happen after further relative movement of the coupling parts has caused the "pocket" to shrink, the casing and rotor separation reducing in this region, until the "pocket" and all the duct, right up to the pressure control valve, are completely filled with oil.

The oil in the reservoir of an operating coupling is centrifugally constrained to form a coherent liquid ring around the outer part of the casing and submerging the inlet ports 24, whilst any air in the reservoir occupies the hollow centre of the oil ring. The oil intake through the inlet ports is therefore comparatively free of air and the space between blades which is not filled with oil during intake remains substantially empty, that is to say vacuum conditions are set up. Under these conditions, the shrinking of the "pocket" described above is accompanied by a sudden and shock-like rise in the oil pressure within it at the instant that the oil content completely fills the pocket and the spaces in communication with it. Then phenomenon is akin to the familiar "fluid" hammer and is accompanied by a sharp noise, so that a slipping coupling where the phenomenon is continuously repeating can sound undesirably noisy.

The undesirable condition referred to can be avoided and the noise reduced or eliminated by inducing a little air into the "pocket" during the oil intake period so that any part of the "pocket" not filled with oil has some air content. When the pocket begins to shrink, the air pressure rises progressively and smoothly, air being freely compressible in contrast to the almost incompressible nature of oil, until the total pressure has reached that corresponding to the relief valve setting. There is no sudden, instantaneous, shock-like pressure rise and in consequence there is reduction or elimination of the associated noise. The action of the coupling is otherwise unaffected.

One method of and means for introducing air as desired is illustrated in Figure 6 which shows the oil reservoir cover 7 as applied to the construction of coupling shown in Figure 3. The oil vortex produced in operation is identified by reference 44 and the hollow centre by reference 45. It will be seen that a small bore pipe 43 bent into inverted U form is arranged in the oil reservoir with its ends entering the two inlet ports 24, there being ample space around these ends for oil flow. One or two small holes 46 are drilled in this tube near its middle, where it passes through the middle part of the oil reservoir normally filled with air in a running coupling.

The effect of the pipe is to induce a little air into the twin inlet ports to mix with the inflowing oil, and its action is extremely effective. The air and oil in the coupling rapidly become so well mixed that almost the whole reservoir of a slipping coupling becomes filled with an intimate oil-air emulsion which acts as an elastic and compressible hydraulic fluid for shock-free power transmission. Shock noise is thereby eliminated. When the coupling ceases to slip the air is centrifugally reseparated from the oil and returns to occupy the central position in the reservoir.

Clearly, similar arrangements can be made to eliminate hydraulic shock noise in the cases of the other forms of coupling illustrated in Figures 1, 2, 4 and 5.

I claim:

1. A slip coupling comprising a driving member, a driven member and a closed path for liquid providing a liquid coupling between the driving and driven members which are procided with surfaces constituting co-operating pumping elements which produce a positive displacement pumping action when the rotational speed of the driving member exceeds that of the driven member causing the liquid to be pumped around said path, liquid flow blocking means disposed in said liquid path, said means being constructed to open when the pressure difference across said means reaches a predetermined limit, air inducing means for inducing air into said liquid path at a point where it can mix with said liquid to form an elastc and compressible medium and air transfer means for transferring air from a region in said liquid path which region is temporarily vacated by said liquid due to centrifugal action during operation of said slip coupling and to direct such air to a region in said liquid path where it can mix with said liquid.

2. A slip coupling comprising a driving member, a driven member and a closed path for liquid providing a liquid coupling between the driving and driven members which are provided with surfaces constituting co-operating pumping elements which produce a positive displacement pumping action when the rotational speed of the driving member exceeds that of the driven member causing the liquid to be pumped around said path, liquid flow blocking means disposed in said liquid path, said means being constructed to open when the pressure difference across said means reaches a predetermined limit, air inducing means for inducing air into said liquid path at a point where it can mix with said liquid to form an elastic and compressible medium and air transfer means for transferring air from a region in said liquid path which region is temporarily vacated by said liquid due to centrifugal action during operation of said slip coupling and to direct such air to a region in said liquid path where it can mix with said liquid, said air transfer means being constituted by a tube positioned in said closed path, said tube having open ends located adjacent liquid inlet ports providing communication between said closed path and the interior of the body of said slip coupling, said tube being formed with at least one orifice through which air occupying said region in the liquid path can pass to said open ends of said tube.

References Cited in the file of this patent

UNITED STATES PATENTS

| | | |
|---|---|---|
| 562,696 | Atwood | June 23, 1896 |
| 871,243 | Shortt | Nov. 19, 1907 |
| 873,978 | Bailey et al. | Dec. 17, 1907 |
| 1,677,996 | Wingquist | July 24, 1928 |
| 2,052,429 | Tyler | Aug. 25, 1936 |
| 2,510,225 | Hindmarch | June 6, 1950 |
| 2,565,289 | Zak | Aug. 21, 1951 |
| 2,575,475 | Stutzke | Nov. 20, 1951 |

FOREIGN PATENTS

| | | |
|---|---|---|
| 701,161 | France | Jan. 5, 1931 |
| 742,976 | Great Britain | Jan. 11, 1956 |